United States Patent
Willcox et al.

(10) Patent No.: US 9,719,872 B2
(45) Date of Patent: Aug. 1, 2017

(54) HIGH OVER-PRESSURE CAPABLE SILICON DIE PRESSURE SENSOR WITH EXTENDED PRESSURE SIGNAL OUTPUT

(71) Applicant: Rosemount Inc., Shakopee, MN (US)

(72) Inventors: Charles Ray Willcox, Chanhassen, MN (US); Jennifer Ann Blodgett, Chanhassen, MN (US); Mark George Romo, Eden Prairie, MN (US)

(73) Assignee: Rosemount Inc., Shakopee, MN (US)

( * ) Notice: Subject to any disclaimer, the term of this patent is extended or adjusted under 35 U.S.C. 154(b) by 19 days.

(21) Appl. No.: 14/868,901

(22) Filed: Sep. 29, 2015

(65) Prior Publication Data

US 2017/0089786 A1    Mar. 30, 2017

(51) Int. Cl.
*G01L 9/12* (2006.01)
*G01L 9/00* (2006.01)

(52) U.S. Cl.
CPC .......... *G01L 9/0041* (2013.01); *G01L 9/0042* (2013.01); *G01L 9/0052* (2013.01); *G01L 9/0072* (2013.01)

(58) Field of Classification Search
None
See application file for complete search history.

(56) References Cited

U.S. PATENT DOCUMENTS 4,163,964 A * 8/1979 De Filippis ............ H01H 35/34
200/81.4
4,364,276 A * 12/1982 Shimazoe ............ G01L 9/0054
73/706
4,535,851 A * 8/1985 Kirkpatrick ........... E21B 21/001
175/218

(Continued)

FOREIGN PATENT DOCUMENTS

DE    3703697    8/1987
DE   69321717    5/1999

(Continued)

OTHER PUBLICATIONS

Notification of Transmittal of the International Search Report and the Written Opinion of the International Searching Authority from PCT/US2016/049187 dated Dec. 13, 2016.

(Continued)

*Primary Examiner* — Andre Allen
(74) *Attorney, Agent, or Firm* — Westman, Champlin & Koehler, P.A.

(57) ABSTRACT

A pressure sensor includes a base having a high-pressure contact portion, and a diaphragm positioned over the base and having an external top surface opposite the base. The external top surface is defined within a closed perimeter and external side surfaces extend down from an entirety of the closed perimeter toward the base. A high-pressure contact portion of the diaphragm is aligned with and separated by a gap from the high-pressure contact portion of the base. A sensing element is coupled to the diaphragm and provides an output based on changes to the diaphragm. When a hydrostatic pressure load above a threshold value is applied to the entire external top surface and external side surfaces of the diaphragm, the hydrostatic pressure load causes the high-pressure contact portion of the diaphragm to contact the high-pressure contact portion of the base.

26 Claims, 9 Drawing Sheets

(56) References Cited

U.S. PATENT DOCUMENTS

| | | | |
|---|---|---|---|
| 4,703,664 A * | 11/1987 | Kirkpatrick | E21B 21/001 73/152.21 |
| 4,782,319 A | 11/1988 | Dell'Acqua et al. | |
| 5,058,435 A * | 10/1991 | Terry | G01L 1/18 338/42 |
| 5,062,302 A | 11/1991 | Petersen et al. | |
| 5,184,515 A * | 2/1993 | Terry | G01L 1/18 338/4 |
| 5,333,504 A | 8/1994 | Lutz et al. | |
| 5,585,311 A | 12/1996 | Ko | |
| 6,647,794 B1 | 11/2003 | Nelson et al. | |
| 6,883,380 B2 | 4/2005 | Romo | |
| 7,240,558 B2 * | 7/2007 | Ernsberger | G01L 19/003 73/719 |
| 8,276,458 B2 | 10/2012 | Hedtke | |
| 9,403,677 B2 | 8/2016 | Doelle | |
| 2002/0017143 A1 * | 2/2002 | Burczyk | G01L 13/025 73/716 |
| 2003/0107096 A1 | 6/2003 | Kurtz et al. | |
| 2006/0086188 A1 * | 4/2006 | Avramescu | G01L 9/0025 73/700 |
| 2013/0118265 A1 * | 5/2013 | Besling | G01L 9/0042 73/724 |
| 2015/0192487 A1 | 7/2015 | Belov et al. | |
| 2016/0146687 A1 | 5/2016 | Longu | |

FOREIGN PATENT DOCUMENTS

| | | |
|---|---|---|
| DE | 10 2010 040 373 | 3/2012 |
| FR | 3007134 | 12/2014 |

OTHER PUBLICATIONS

Notification of Transmittal of the International Search Report and the Written Opinion of the International Searching Authority from PCT/US2016/053890, dated Jun. 1, 2017.

* cited by examiner

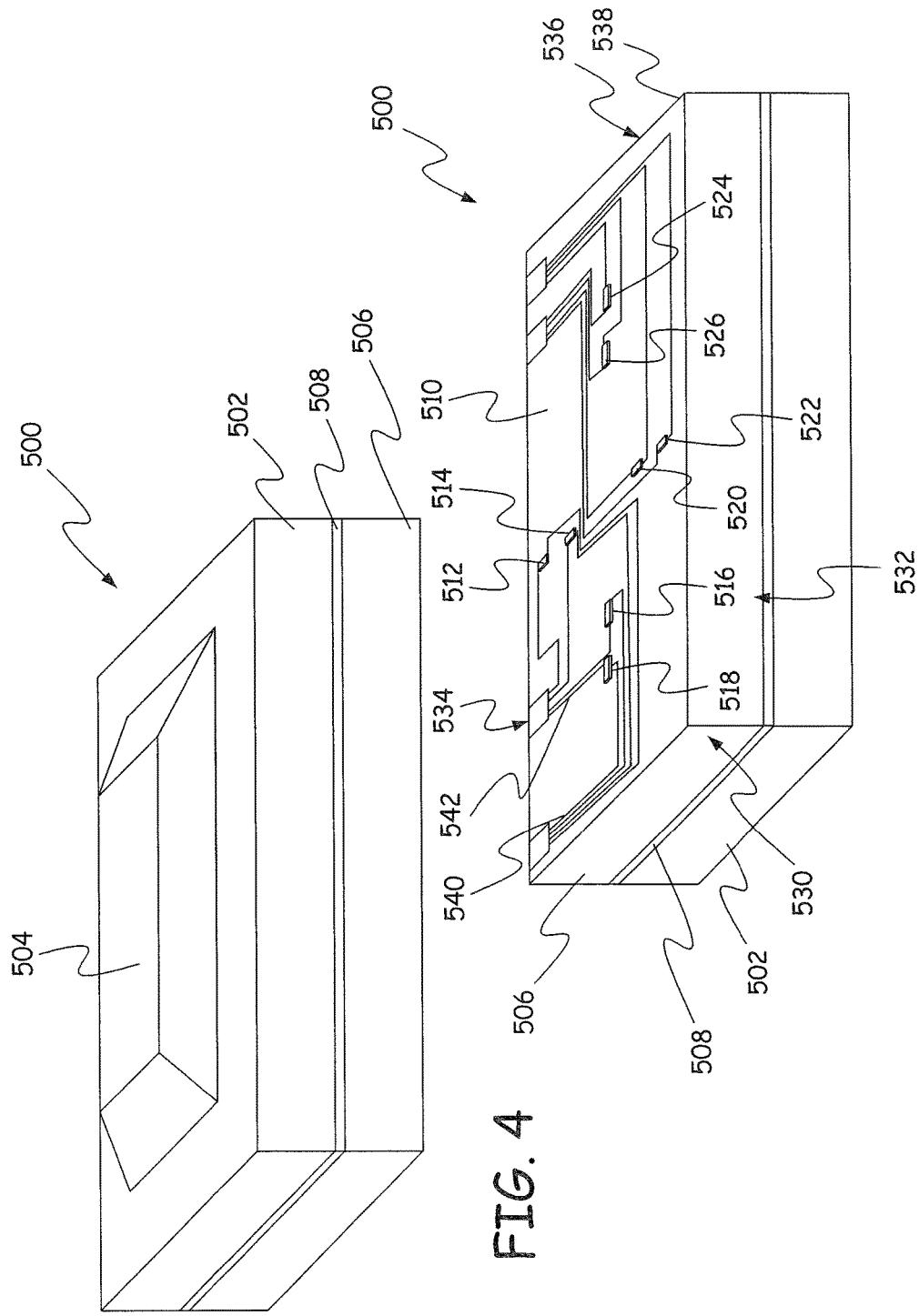

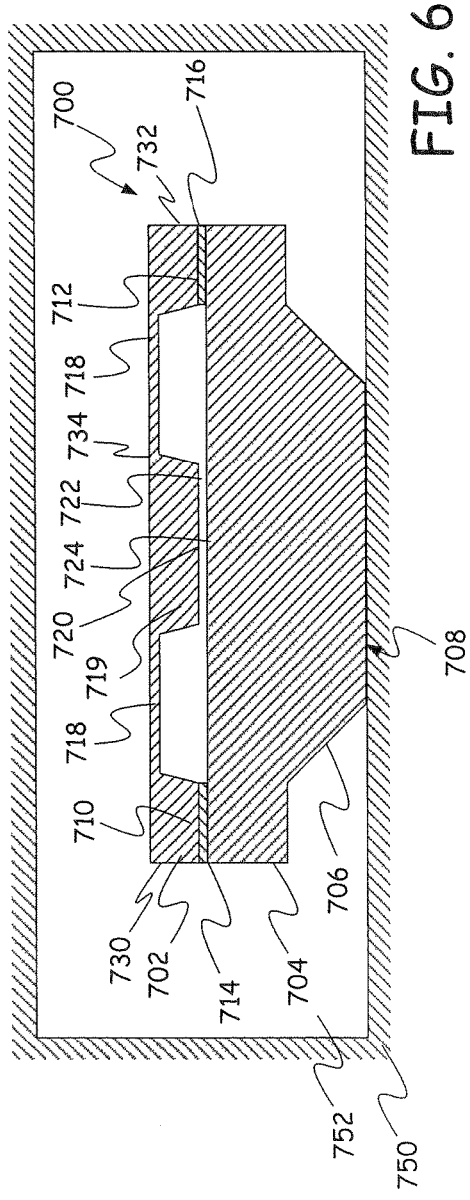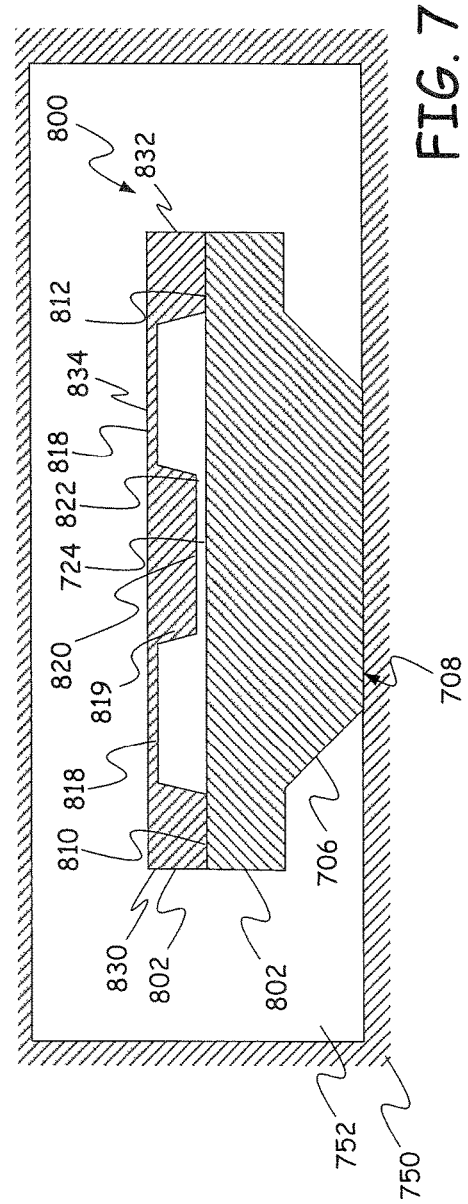

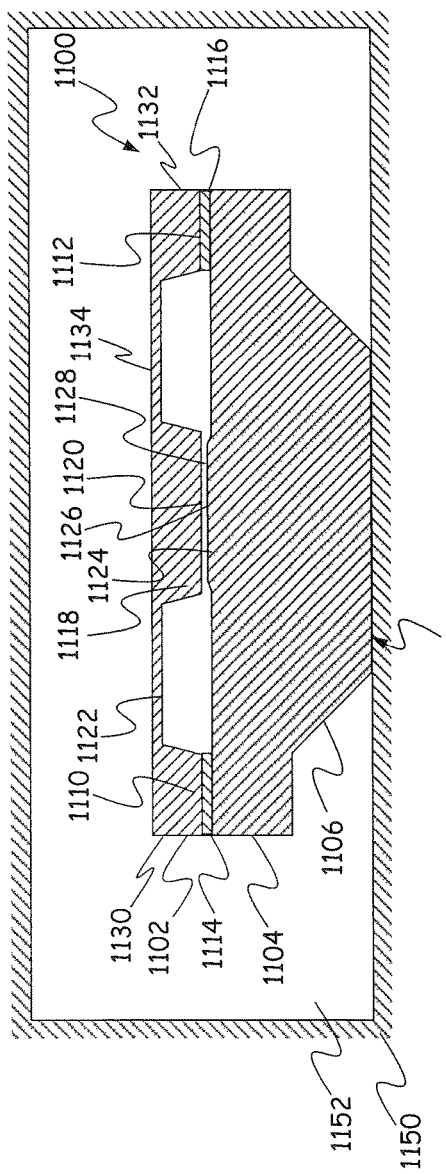
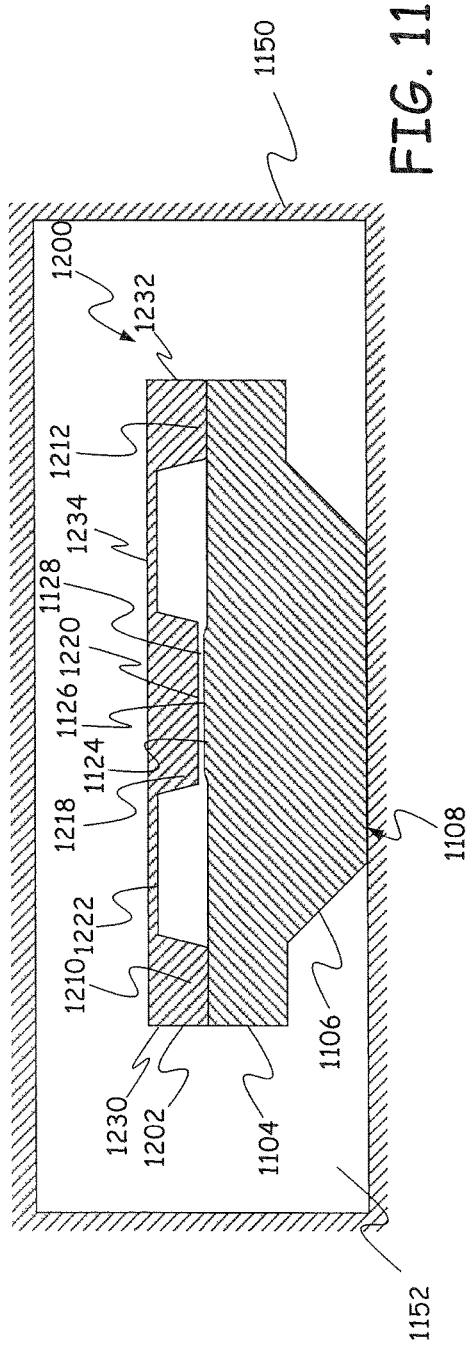

HIGH OVER-PRESSURE CAPABLE SILICON DIE PRESSURE SENSOR WITH EXTENDED PRESSURE SIGNAL OUTPUT

FIELD

The present disclosure relates to pressure sensors. In particular, the present disclosure relates to pressure sensors with over-pressure protection.

BACKGROUND

In many pressure sensors, a flexible diaphragm moves relative to a base in response to pressure applied to the top of the diaphragm. Diaphragms that provide repeatable monotonic movement in response to applied pressures are preferred. As a result, crystalline diaphragms, such as those made from crystalline silicon have been widely adopted since they provide monotonic movement in response to applied pressures and are generally free of hysteretic effects. Unfortunately, sensors with such crystalline structures have limited over-pressure capability and excessive pressure on the sensor diaphragm can cause large tensile stresses that exceed the crystalline structure's maximum fracture strength. Failures in such sensors tend to be catastrophic often resulting in an entirely shattered structure.

SUMMARY

A pressure sensor includes a base having a high-pressure contact portion, and a diaphragm positioned over the base and having an external top surface opposite the base. The external top surface is defined within a closed perimeter and external side surfaces that extend down from an entirety of the closed perimeter toward the base. A high-pressure contact portion of the diaphragm is aligned with and separated by a gap from the high-pressure contact portion of the base. A sensing element is coupled to the diaphragm and provides an output dependent on changes to the diaphragm. When a hydrostatic pressure load above a threshold value is applied to the entire external top surface and external side surfaces of the diaphragm, the hydrostatic pressure load causes the high-pressure contact portion of the diaphragm to contact the high-pressure contact portion of the base.

A process variable transmitter has a sensor that includes a base with a support and a diaphragm mounted on the base and isolated from contact with other structures. The diaphragm flexes in response to pressure applied to a top and sides of the diaphragm such that above a threshold pressure a portion of the diaphragm makes contact with a portion of the base. The diaphragm has a secondary deflectable region that continues to deflect after the portion of the diaphragm contacts the portion of the base. At least one sensing element senses the flexing of the diaphragm and provides an output signal indicative of the flexing of the diaphragm. At least one sensing element also senses deflection of the secondary deflectable region after the diaphragm contacts the base and provides an output signal indicative of deflection of the secondary deflectable region after the diaphragm contacts the base

BRIEF DESCRIPTION OF THE DRAWINGS

FIG. 4 provides a bottom perspective view of a pressure sensor of one embodiment.

FIG. 5 provides a top perspective view of the pressure sensor of FIG. 4.

FIG. 6 provides a sectional view of a pressure sensor of one embodiment.

FIG. 7 provides a sectional view of a pressure sensor of a second embodiment.

FIG. 10 provides a sectional view of a pressure sensor of a fifth embodiment.

FIG. 11 provides a sectional view of a pressure sensor of a sixth embodiment.

DETAILED DESCRIPTION OF ILLUSTRATIVE EMBODIMENTS

The various embodiments provide pressure sensors with crystalline diaphragms, where the pressure sensors include over-pressure bosses and use hydrostatic loading on the sides of the diaphragm and the top of the diaphragm to limit tensile stresses on the diaphragm.

Figure 1:
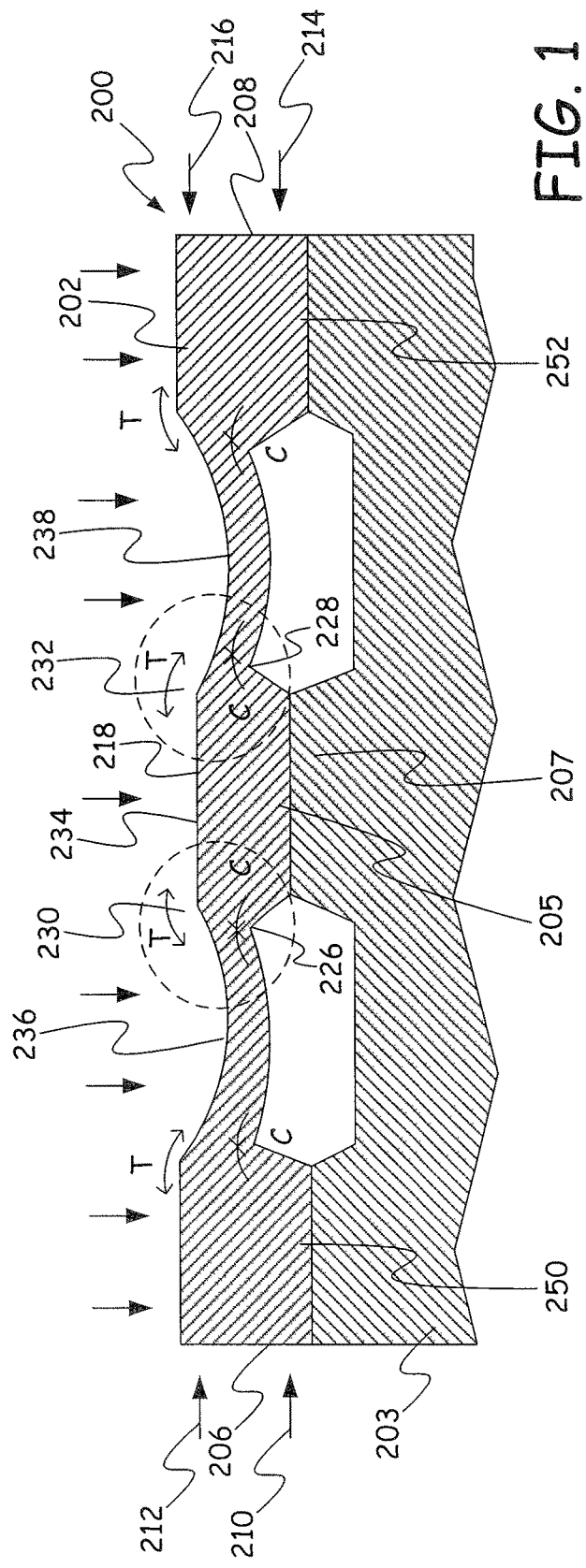
FIG. 1 provides a sectional view of one embodiment of a pressure sensor under high enough pressure such that the diaphragm is contacting a portion of the base and showing tensile and compression stresses.

In accordance with the various embodiments, a pressure sensor 200 of FIG. 1 is provided that includes a diaphragm 202 that is mounted to a base 203 at bonding portions, such as bonding portions 250 and 252 of diaphragm 202. High-pressure contact portions on diaphragm 202 and/or a base 203, such as bosses 205 and 207, interact with each other to inhibit movement of a portion of diaphragm 202 when a hydrostatic pressure load above a threshold is applied to the external top surface 218 and external side surfaces, such as sides 206 and 208, of diaphragm 202. The lateral hydrostatic load applied to sides 206 and 208 is shown by arrows 210, 212, 214 and 216. The contact between diaphragm 202 and base 203 at bosses 205 and 207 together with the lateral hydrostatic load on the sides of diaphragm 202 combine to reduce the tensile stresses applied to the diaphragm 202 such that the maximum principle stress applied to the diaphragm actually decreases as the applied pressure on top surface 218 and sides 206 and 208 increases. This can be seen in the graphs of FIG. 2, which shows applied pressure along horizontal axis 300 and maximum principle stress along vertical axis 302.

Figure 2:
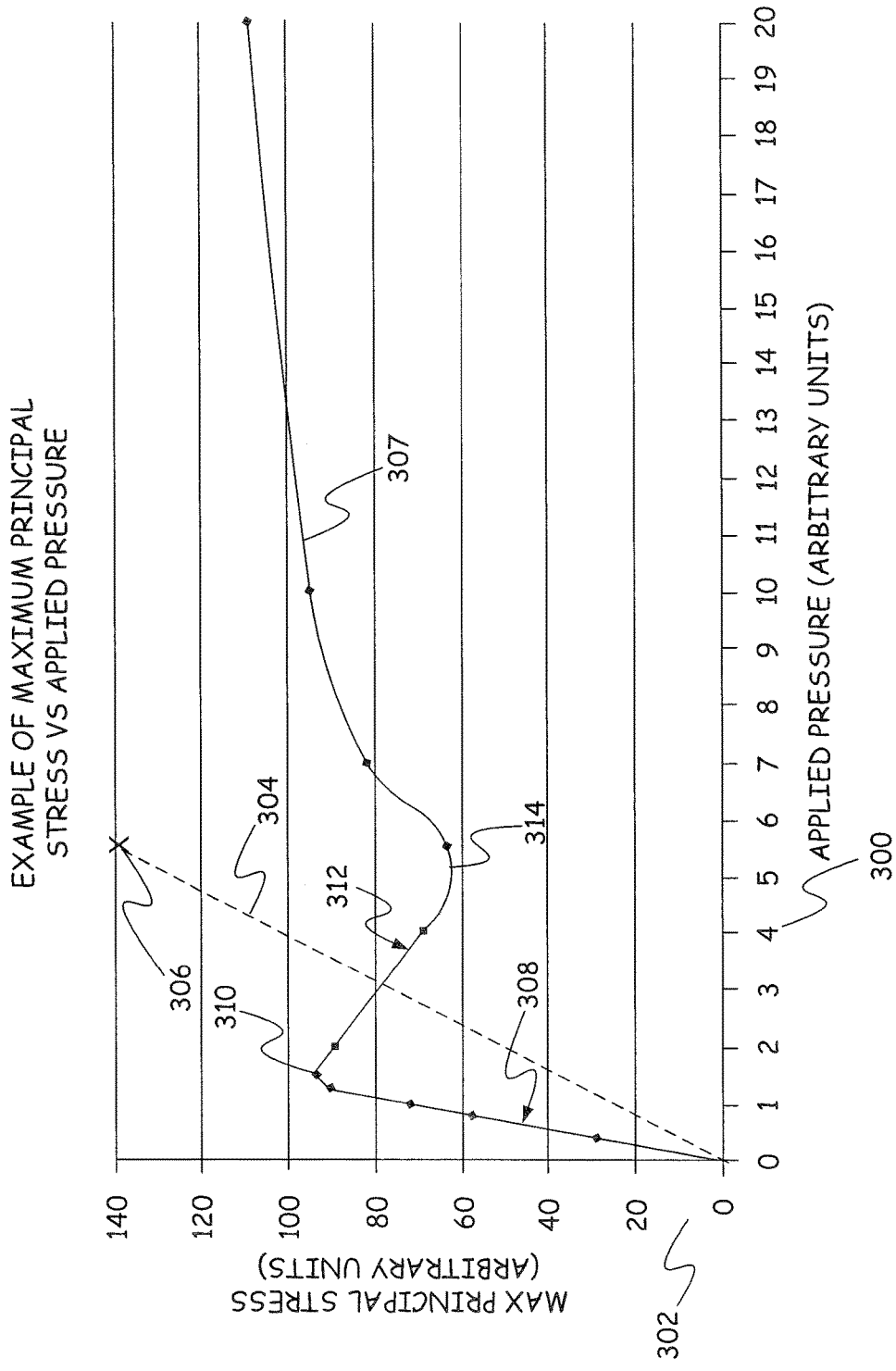
FIG. 2 provides example graphs of maximum principle stress as a function of applied pressures.

Graph 304 of FIG. 2 indicates that the maximum principle stress for the diaphragm of a prior art pressure sensor. In graph 304, indicated by a dashed line, the maximum principle stress increases linearly with the applied pressure until a point 306 is reached at which point the stress exceeds the fracture stress for the diaphragm and the diaphragm fractures. Graph 307 of FIG. 2 shows an example of how the maximum principle stress changes with applied pressure for diaphragm sensors of the present embodiments. In FIG. 2, the maximum principle stress increases linearly with applied pressure along portion 308. This occurs when diaphragm 202 flexes without the boss(es) making contact. At point 310, one or more of the bosses make contact. After the boss(es) make contact, the maximum principle stress decreases with applied pressure along portion 312 before beginning to increase again at point 314.

In the embodiment shown in FIG. 2, the change in the maximum principle stress due to the applied pressure before the boss(es) make contact along portion 308 of graph 307 is greater than the change in maximum principle stress for the prior art diaphragm, shown in graph 304. After point 314 in graph 307, the rate of change in the principle stress due to applied pressure is considerably lower than when the boss(es) was not in contact. Note that the maximum principle stresses are not locations where sensing elements, such as resistive strain gages, would be placed since resistive strain gages should be placed in locations that have monotonic changes between the stress and the applied pressure. However, the maximum principle stress indicates the stress at a likely failure point in the diaphragm since the diaphragm is likely to fail at the location that has the highest tensile stress.

In addition to reducing the maximum principle stress, the contact between the bosses and the lateral hydrostatic load convert tensile stresses found in prior art diaphragms into compression stresses at locations 226 and 228 of FIG. 1. Thus, internal portions 226 and 228 of diaphragm 202 that are next to contact portion 205 of diaphragm 202 are under a compression stress after contact portion 205 contacts contact portion 207 of base 203. Conversely, external locations 230 and 232 of diaphragm 202 that are next to an external portion 234 that is above contact portion 205 are under tensile stress. Areas of the diaphragm that are not above a high-pressure contact portion or a bonding area of the diaphragm, such as areas 236 and 238 act as secondary deflectable regions that continue to deflect after the high-pressure contact portions of the diaphragm contact the base.

Crystalline diaphragm structures, such as crystalline silicon are generally able to tolerate compressive stress magnitudes far in excess of their maximum tensile stresses. Because the effective "lever arm" is also reduced due to the constrained boss, all stress magnitudes, both tensile and compressive are also reduced compared to the unconstrained boss case. Once the diaphragm becomes constrained from moving vertically by the contact with the boss, the lateral hydrostatic load develops a lateral compression within the diaphragm. Consequently, all tensile forces are reduced and all compressive forces are increased. By keeping the tensile stresses in check, the sensor is able to survive much higher external pressures than would otherwise be possible had the pressure only been applied to the top surface of the diaphragm.

Figure 3:
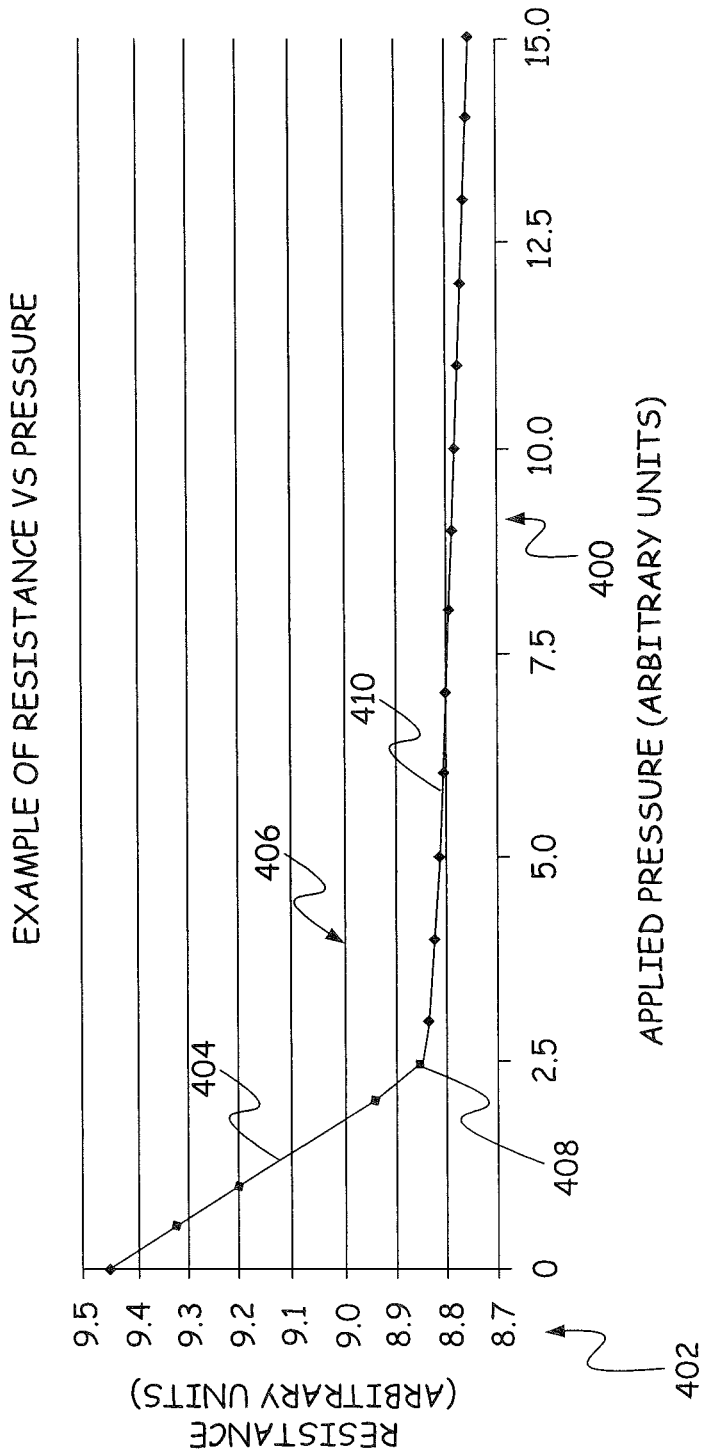
FIG. 3 provides an example graph of resistance values for diaphragm-edge tensile strain resistor on a pressure sensor of one embodiment as a function of pressure.

FIG. 3 provides an example graph of resistance versus pressure for a diaphragm-edge tensile strain resistor applied to the top of diaphragm 202 of FIG. 1. In FIG. 3, pressure is shown along horizontal axis 400 and resistance is shown along vertical axis 402. Before the boss of the diaphragm and/or base makes contact, the resistance changes monotonically as shown by portion 404 of graph 406. In accordance with some embodiments, portion 404 extends along the normal operating pressure range of the pressure sensor. When the applied pressure reaches the top of the normal operating pressure range, the boss(es) make contact at point 408 in graph 406. After the boss(es) make contact, the resistance continues to change monotonically with the applied pressure along portion 410 but at a different rate than along portion 404. This creates an opportunity for the system to continue to measure pressures well beyond the sensor's normal operating pressure range.

FIG. 4 provides a bottom perspective view and FIG. 5 provides a top perspective view of a pressure sensor 500 in accordance with one embodiment. In FIG. 4, pressure sensor 500 includes a base 502 having a pedestal or support 504 that is centrally located and can be connected to a housing that defines a chamber around pressure sensor 500. Diaphragm 506 is positioned above base 502 and is bonded to base 502 by a bonding layer 508. Along a top surface 510 of diaphragm 506, one or more sensing elements, such as sensing elements 512, 514, 516, 518, 520, 522, 524 and 526 are positioned to sense flexing of diaphragm 506 and/or changes in diaphragm 506 as it flexes in response to pressures applied to top surface 510 and side surfaces 530, 532, 534 and 536, which extend from top surface 510 along a closed perimeter 538 around top surface 510. Thus, side surfaces extend around the entirety of top surface 510 such that diaphragm 506 is isolated from contact with other structures and such that fluid around diaphragm 506 can apply lateral hydrostatic loading forces on each of the sides extending down from top surface 510 along the entirety of the closed perimeter 538 around top surface 510.

Sensing elements 512, 514, 516, 518, 520, 522, 524 and 526 each provide an output based on changes to diaphragm 506. In some embodiments, this output is an electrical characteristic such as a resistance or capacitance that can be sensed by applying an electrical current and/or voltage through electrical traces such as electrical traces 540 and 542 connected to sensing element 518. For example, when the sensing elements are piezoresistive elements, a current is passed through the piezoresistive element using the electrical traces and the resistance of the piezoresistive sensing element is measured based on the current or voltage output of the piezoresistive sensing element. Although piezoresistive sensing elements have been discussed, other examples of sensing elements include capacitance, optical displacement sensing, piezoelectric, and resonance sensing are possible.

In accordance with some embodiments, diaphragm 506 and base 502 are both formed from isotropically or anisotropically etched silicon wafers that are patterned to provide certain features as described below and then diced or cut from the wafers.

FIGS. 6 and 7 provide sectional views of pressure sensors 700 and 800, which represent two different embodiments. In FIG. 6, pressure sensor 700 includes diaphragm 702, base 704 and sensing elements on diaphragm 702 that are too small to be seen in FIG. 6. In accordance with some embodiments, diaphragm 702 and base 704 are both formed from isotropically or anisotropically etched silicon wafers that are patterned to provide certain features as described below and then diced or cut from the wafers. Base 704 has an etched pedestal 706, which acts as a stress isolation structure to keep package and mounting induced stresses from affecting the operation of pressure sensor 700. A bottom surface 708 of pedestal 706 mounts to a housing 750 such that diaphragm 702 is isolated from contact with other structures outside of pressure sensor 700 and is surrounded by fluid within a chamber 752 defined by housing 750. Diaphragm 702 has a top surface 734 opposite base 704 and side surfaces that extend from top surface 734 toward base 704, such as side surfaces 730 and 732, along a closed perimeter around top surface 734. Thus, side surfaces extend around the entirety of top surface 734 such that diaphragm 702 is isolated from contact with other structures and such that fluid around diaphragm 702 can apply lateral hydrostatic pressure on each of the sides extending down from top surface 734 along the entirety of the closed perimeter around top surface 734. Diaphragm 702 also includes mounting portions or bonding portions 710 and 712 that are joined to base 704 by bonding layer portions 714 and 716. In one embodiment, bonding layer portions 714 and 716 is a high temperature glass-based bonding material often referred to as "frit". Bonding or mounting portions 710 and 712 protrude toward base 704 relative to an interior portion 718 of the diaphragm 702.

A high-pressure contact portion 720 of a boss 719 that is centrally located on diaphragm 702 protrudes toward base 704 from interior portion 718 is separated from a high-pressure contact portion 724 of base 704 by a gap 722. Across a first range of pressures, high-pressure contact portion 720 does not contact base 704 and sensing elements on diaphragm 702 provide a monotonic first rate of change with changes in applied pressures to the sides 730, 732 and top 734 of diaphragm 702. Above a pressure threshold, high-pressure contact portion 720 contacts base 704 at high-pressure contact point 724. After this contact, interior portion 718 acts as a secondary deflectable region and continues to deflect with increases in the hydrostatic pressure load. The rate of change of the output of the sensing elements as a function of increased pressure changes after contact and becomes smaller than the rate of change before the contact. However, the change in the sensing element's output remains monotonic even after contact between diaphragm 702 and base 704.

In accordance with some embodiments, the thickness of gap 722 is controlled by the thickness of frit portions 714 and 716 such that high-pressure contact portion 720 is level with exterior surfaces of mounting portions 710 and 712.

Pressure sensor 800 of FIG. 7 is similar to the embodiment of FIG. 6 and elements that are common to the embodiment of FIG. 6 are numbered similarly and operate in the same manner. In the embodiment of FIG. 7, bonding layer portions 714 and 716 have been removed and a diaphragm 802 with a shortened boss 819 and a centrally located high-pressure contact portion 820 is used in place of diaphragm 702. High-pressure contact portion 820 does not protrude from an interior portion 818 of diaphragm 802 as much as high-pressure contact portion 720 of FIG. 6 protrudes from interior portion 718. As a result, high-pressure contact portion 820 is recessed relative to mounting portions 810 and 812 so as to provide a gap 822 between high-pressure contact portion 724 of base 704 and high-pressure contact portion 820. In accordance with some embodiments, diaphragm 802 and base 704 are both formed from isotropically or anisotropically etched silicon wafers that are patterned to provide certain features as described below and then diced or cut from the wafers.

Diaphragm 802 has a top surface 834 opposite base 704 and side surfaces that extend from top surface 834, such as side surfaces 830 and 832, along a closed perimeter around top surface 834. Thus, side surfaces extend around the entirety of top surface 834 such that diaphragm 802 is isolated from contact with other structures and such that fluid around diaphragm 802 can apply lateral hydrostatic loading forces on each of the sides extending down from top surface 834 along the entirety of the closed perimeter around top surface 834.

In the embodiment of FIG. 7, diaphragm 802 is bonded to base 704 through a process such as a fusion bond, an anodic bond, a silicon alloy bond or a metal solder bond, for example. For embodiments that use an anodic bond, the diaphragm is made from silicon while the base is made from an ionic alkali glass.

In operation, pressure applied to sides 830 and 832 and top 834 of diaphragm 802 cause interior portion 818 of diaphragm 802 to flex toward base 704 such that sensing elements on top surface 834 provide monotonic signal changes with changes in the pressure. Above a pressure threshold, high-pressure contact portion 820 of diaphragm 802 contacts high-pressure contact portion 724 of base 704. After this contact, interior portion 818 acts as a secondary deflectable region and continues to deflect with increases in the hydrostatic pressure load. The rate of change of the output of the sensing elements as a function of increased pressure changes after contact and becomes smaller than the rate of change before the contact. However, the change in the sensing element's output remains monotonic even after contact between diaphragm 802 and base 704.

Figure 8:
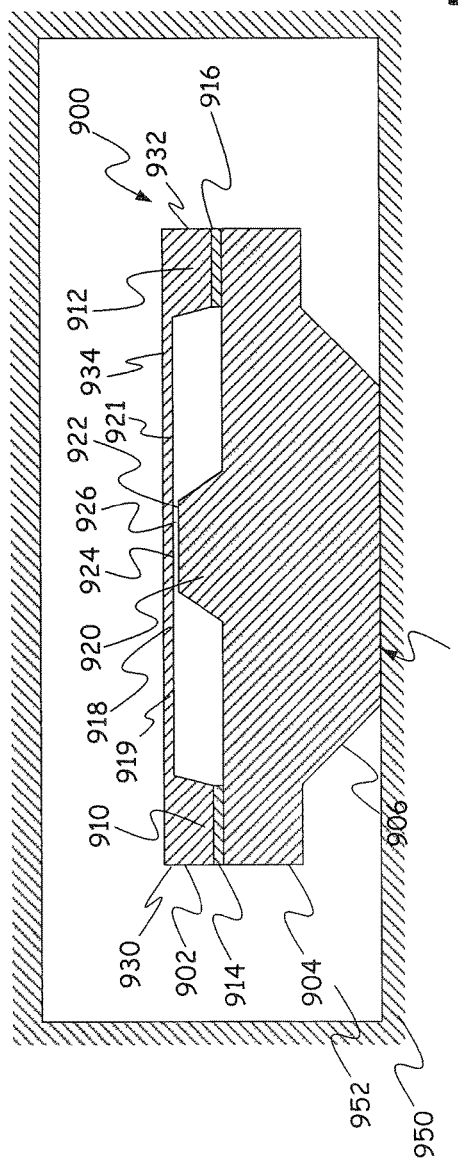
FIG. 8 provides a sectional view of a pressure sensor of a third embodiment.

FIG. 8 provides a sectional view of a pressure sensor 900 in accordance with a further embodiment. Pressure sensor 900 is mounted within a chamber 952 defined by a housing 950. Pressure sensor 900 includes a diaphragm 902, a base 904, and sensing elements that are too small to be seen in the view of FIG. 8. In accordance with some embodiments, diaphragm 902 and base 904 are both formed from isotropically or anisotropically etched silicon wafers that are patterned to provide certain features as described below and then diced or cut from the wafers.

Diaphragm 902 has a top surface 934 opposite base 904 and side surfaces that extend from top surface 934, such as side surfaces 930 and 932, along a closed perimeter around top surface 934. Thus, side surfaces extend around the entirety of top surface 934 such that diaphragm 902 is isolated from contact with other structures and such that fluid around diaphragm 902 can apply lateral hydrostatic loading forces on each of the sides extending down from top surface 934 along the entirety of the closed perimeter around top surface 934.

Base 904 includes a pedestal 906 having a mounting area 908 that mounts to housing 950 to allow fluid in chamber 952 to apply the lateral hydrostatic loads to sides 930 and 932 of diaphragm 902 and the vertical hydrostatic load to top 934 of diaphragm 902. Pedestal 906 acts as a stress isolation structure to keep package and mounting-induced stresses from affecting the operation of the sensor and to isolate diaphragm 902 from contact with other structures outside of pressure sensor 900.

Diaphragm 902 includes mounting portions 910 and 912 that protrude from an interior portion 918 of diaphragm 902 and are secured to base 904 by bonding layer portions 914 and 916. In accordance with one embodiment, bonding layer portions 914 and 916 are a high temperature glass-based bonding material often referred to as frit.

Base 904 includes a mesa 920 that protrudes toward interior portion 918 of diaphragm 902 and has a high-pressure contact portion 922 that aligns with a high-pressure contact portion 924 that is centrally located on an interior portion 918 of diaphragm 902. A gap 926 separates high-pressure contact portion 922 of base 904 from high-pressure contact portion 924 of diaphragm 902. In FIG. 8, interior portion 918 of diaphragm 902 is shown as being planar.

In operation, pressure applied to sides 930 and 932 and top 934 of diaphragm 902 cause interior portion 918 of diaphragm 902 to flex toward base 904 such that sensing elements on top surface 934 provide monotonic signal changes with changes in the pressure. Above a pressure threshold, high-pressure contact portion 924 of diaphragm 902 contacts mesa 920 at high-pressure contact portion 922. After this contact, portions 919 and 921 of interior portion 918 act as secondary deflectable regions and continue to deflect with increases in the hydrostatic pressure load. The rate of change of the output of the sensing elements as a function of increased pressure changes after contact and becomes smaller than the rate of change before the contact. However, the change in the sensing element's output remains monotonic even after contact between diaphragm 902 and mesa 920.

Figure 9:
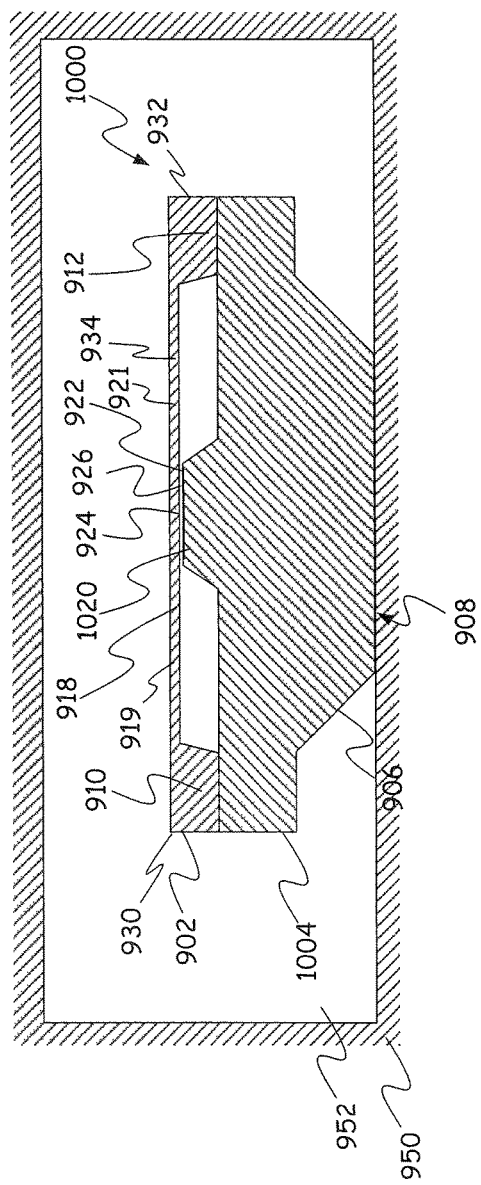
FIG. 9 provides a sectional view of a pressure sensor of a fourth embodiment.

FIG. 9 provides a sectional view of a pressure sensor 1000 that is similar to pressure sensor 900 of FIG. 8 except that bonding layer portions 914 and 916 have been removed and the height of mesa 920 has been shortened to form mesa 1020 in base 1004 such that the size of gap 926 continues to be the same. In accordance with some embodiments, diaphragm 902 and base 1004 are both formed from isotropically or anisotropically etched silicon wafers that are patterned to provide certain features as described below and then diced or cut from the wafers. Elements that are common to pressure sensor 900 are similarly numbered for pressure sensor 1000 and operate in the same manner as discussed above for pressure sensor 900. In pressure sensor 1000, diaphragm 902 is bonded to base 904 through a bonding technique such as fusion bonding, silicon alloy bonding, anodic bonding or metal solder bonding. For embodiments that use an anodic bond, the diaphragm is made from silicon while the base is made from an ionic alkali glass.

In operation, pressure applied to sides 930 and 932 and top 934 of diaphragm 902 cause interior portion 918 of diaphragm 902 to flex toward base 904 such that sensing elements on top surface 934 provide monotonic signal changes with changes in the pressure. Above a pressure threshold, high-pressure contact portion 924 of diaphragm 902 contacts mesa 1020 at high-pressure contact portion 922. After this contact, portions 919 and 921 of interior portion 918 act as secondary deflectable regions and continue to deflect with increases in the hydrostatic pressure load. The rate of change of the output of the sensing elements as a function of increased pressure changes after contact and becomes smaller than the rate of change before the contact. However, the change in the sensing element's output remains monotonic even after contact between diaphragm 902 and mesa 1020.

FIG. 10 provides a sectional view of a pressure sensor 1100 under a further embodiment. Pressure sensor 1100 includes a diaphragm 1102, a base 1104, and sensing elements that are too small to be seen in the view of FIG. 10. In accordance with some embodiments, diaphragm 1102 and base 1104 are both formed from isotropically or anisotropically etched silicon wafers that are patterned to provide certain features as described below and then diced or cut from the wafers. Diaphragm 1102 has a top surface 1134 opposite base 1104 and side surfaces that extend from top surface 1134, such as side surfaces 1130 and 1132, along a closed perimeter around top surface 1134. Thus, side surfaces extend around the entirety of top surface 1134 such that diaphragm 1102 is isolated from contact with other structures and such that fluid around diaphragm 1102 can apply lateral hydrostatic loading forces on each of the sides extending down from top surface 1134 along the entirety of the closed perimeter around top surface 1134.

Base 1104 has a pedestal 1106 with a mounting surface 1108. Pedestal 1106 allows pressure sensor 1100 to be mounted to housing 1150, which forms a chamber 1152, such that fluid can provide the lateral hydrostatic load to sides 1130 and 1132 of diaphragm 1102 and can provide the vertical hydrostatic load to top 1134 of diaphragm 1102. Pedestal 1106 acts as a stress isolation structure to keep package and mounting induced stresses from affecting the operation of the sensor and to isolate diaphragm 1102 from contact with other structures outside of pressure sensor 1100.

Diaphragm 1102 includes bonding portions 1110 and 1112 that protrude toward base 1104 and are mounted to base 1104 by bonding layer portions 1114 and 1116. In accordance with one embodiment, bonding layer portions 1114 and 1116 are high temperature glass-based bonding materials often referred to as frit. Diaphragm 1102 also includes a boss 1118 having a centrally located high-pressure contact portion 1120. Boss 1118 protrudes toward base 1104 relative to an interior portion 1122 of diaphragm 1102. Base 1104 includes a mesa 1124 having a high-pressure contact portion 1126. Mesa 1124 protrudes toward diaphragm 1102. A gap 1128 is formed between boss 1118 and mesa 1124 at high-pressure contact portions 1120 and 1126. Over a first pressure range, lateral pressures on sides 1130 and 1132 and vertical pressure on top 1134 of diaphragm 1102 cause boss 1118 to move into gap 1128. Over the first pressure range, sensing elements on diaphragm 1102 produce an output that is monotonic with pressure changes and has a first rate of change with changes in the applied pressure. At a threshold pressure, high-pressure contact portion 1120 contacts high-pressure contact portion 1126. After this contact, interior portion 1122 acts as a secondary deflectable region and continues to deflect with increases in the hydrostatic pressure load causing sensing elements on diaphragm 1102 to continue to provide an output that is monotonic with pressure changes but that has a second rate of change with changes in the applied pressure.

FIG. 11 provides a sectional view of a pressure sensor 1200 that is similar to pressure sensor 1100 of FIG. 10 except that bonding layer portions 1114 and 1116 have been eliminated and diaphragm 1102 has been replaced by diaphragm 1202. In accordance with some embodiments, diaphragm 1202 and base 1104 are both formed from isotropically or anisotropically etched silicon wafers that are patterned to provide certain features as described below and then diced or cut from the wafers. Diaphragm 1202 has a top surface 1234 opposite base 1104 and side surfaces that extend from top surface 1234, such as side surfaces 1230 and 1232, along a closed perimeter around top surface 1234. Thus, side surfaces extend around the entirety of top surface 1234 such that diaphragm 1202 is isolated from contact with other structures and such that fluid around diaphragm 1202 can apply lateral hydrostatic loading forces on each of the sides extending down from top surface 1234 along the entirety of the closed perimeter around top surface 1234.

Diaphragm 1202 also includes bonding portions 1210 and 1212 that protrude toward base 1104 and are mounted directly to base 1104. Bonding portions 1210 and 1212 extend further from interior portion 1222 of diaphragm 1202 than bonding portions 1110 and 1112 extend from interior portion 1122 of diaphragm 1102. Diaphragm 1202 also includes a boss 1218 having a centrally located high-pressure contact portion 1220. Boss 1218 protrudes toward base 1104 relative to interior portion 1222. Other elements that are common to pressure sensor 1200 and pressure sensor 1100 are numbered the same as they are number in FIG. 10 and operate in the same manner.

In the embodiment of FIG. 11, diaphragm 1202 is bonded to base 1104 through a process such as a fusion bond, an anodic bond, a silicon alloy bond or a metal solder bond, for example. For embodiments that use an anodic bond, the diaphragm is made from silicon while the base is made from an ionic alkali glass.

Over a first pressure range, lateral pressures on sides 1230 and 1232 and vertical pressure on top 1234 of diaphragm 1202 cause boss 1218 to move into gap 1128. Over the first pressure range, sensing elements on diaphragm 1202 produce an output that is monotonic with pressure changes and has a first rate of change with changes in the applied pressure. At a threshold pressure, high-pressure contact portion 1220 contacts high-pressure contact portion 1126. After this contact, interior portion 1222 acts as a secondary deflectable region and continues to deflect with increases in the hydrostatic pressure load causing sensing elements on diaphragm 1202 to continue to provide an output that is monotonic with pressure changes but that has a second rate of change with changes in the applied pressure.

Figure 12:
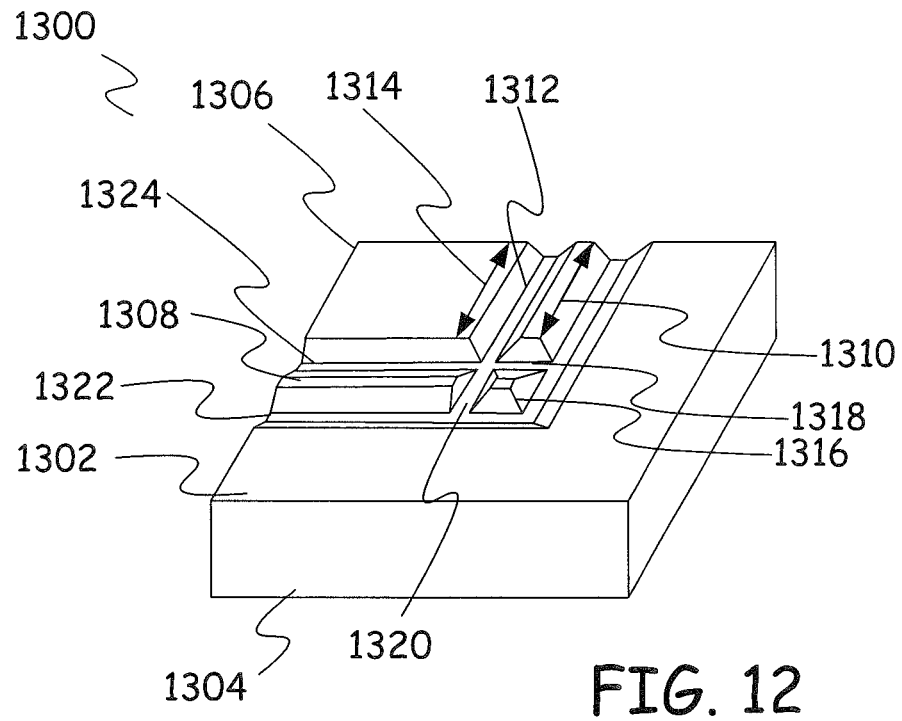
FIG. 12 provides a bottom perspective view of a quarter symmetry section of a diaphragm of a further embodiment.
Figure 13:
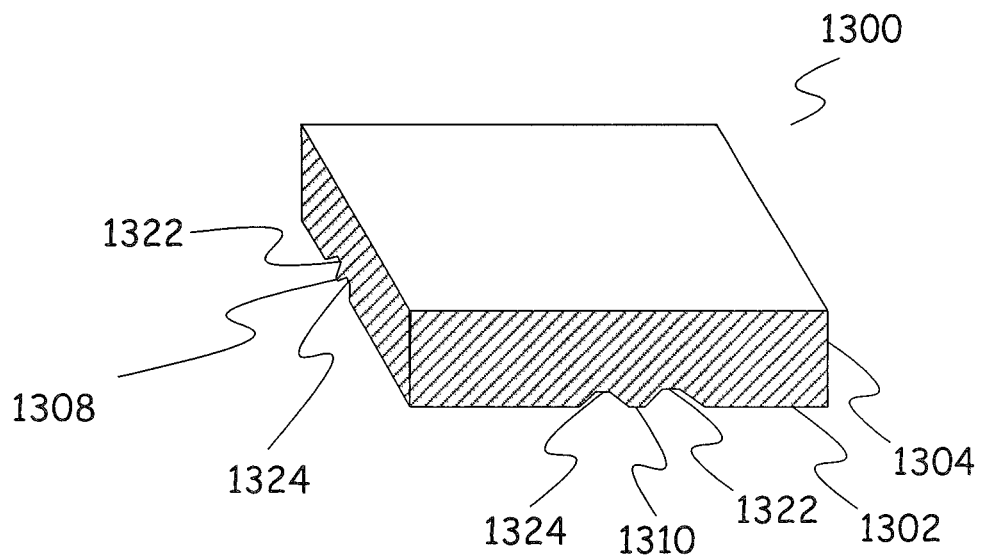
FIG. 13 provides a top perspective view of the section of the diaphragm of FIG. 12.

FIG. 12 provides a bottom perspective view and FIG. 13 provides a top perspective view of a quarter symmetry section 1300 of a diaphragm in accordance with a further embodiment. Diaphragm section 1300 is shown to include bonding portion 1302 that extends around an outer perimeter 1304 of the diaphragm. A main boss 1306 located at the center of the diaphragm extends down from the bottom surface of the diaphragm toward the base of the pressure sensor. Secondary bosses 1308 and 1310 form ridges that have lengths that match the lengths of main boss 1306. For example, length 1312 of secondary boss 1310 matches length 1314 of main boss 1306. In the complete diaphragm, there are four secondary bosses, one on each side of main boss 1306.

Diaphragm section 1300 also includes a pyramid boss 1316 that is formed along the intersection of lines extending from and along secondary bosses 1308 and 1310. Pyramid boss 1316 is separated from secondary boss 1310 by a channel 1318 and is separated from secondary boss 1308 by a channel 1320. In the full diaphragm, there are four such pyramid bosses. Secondary bosses 1308 and 1310 and pyramid boss 1316 are separated from bonding portion 1302 by a channel 1322 that extends around the interior of bonding portion 1302 along the entirety of the diaphragm. Secondary bosses 1308 and 1310 are separated from main boss 1306 by a channel 1324 that surrounds main boss 1306.

Each of main boss 1306, secondary bosses 1308 and 1310 and pyramid boss 1316 can act as a high-pressure contact portion that will contact the base area when the pressure applied to the diaphragm exceeds a threshold.

Figure 14:
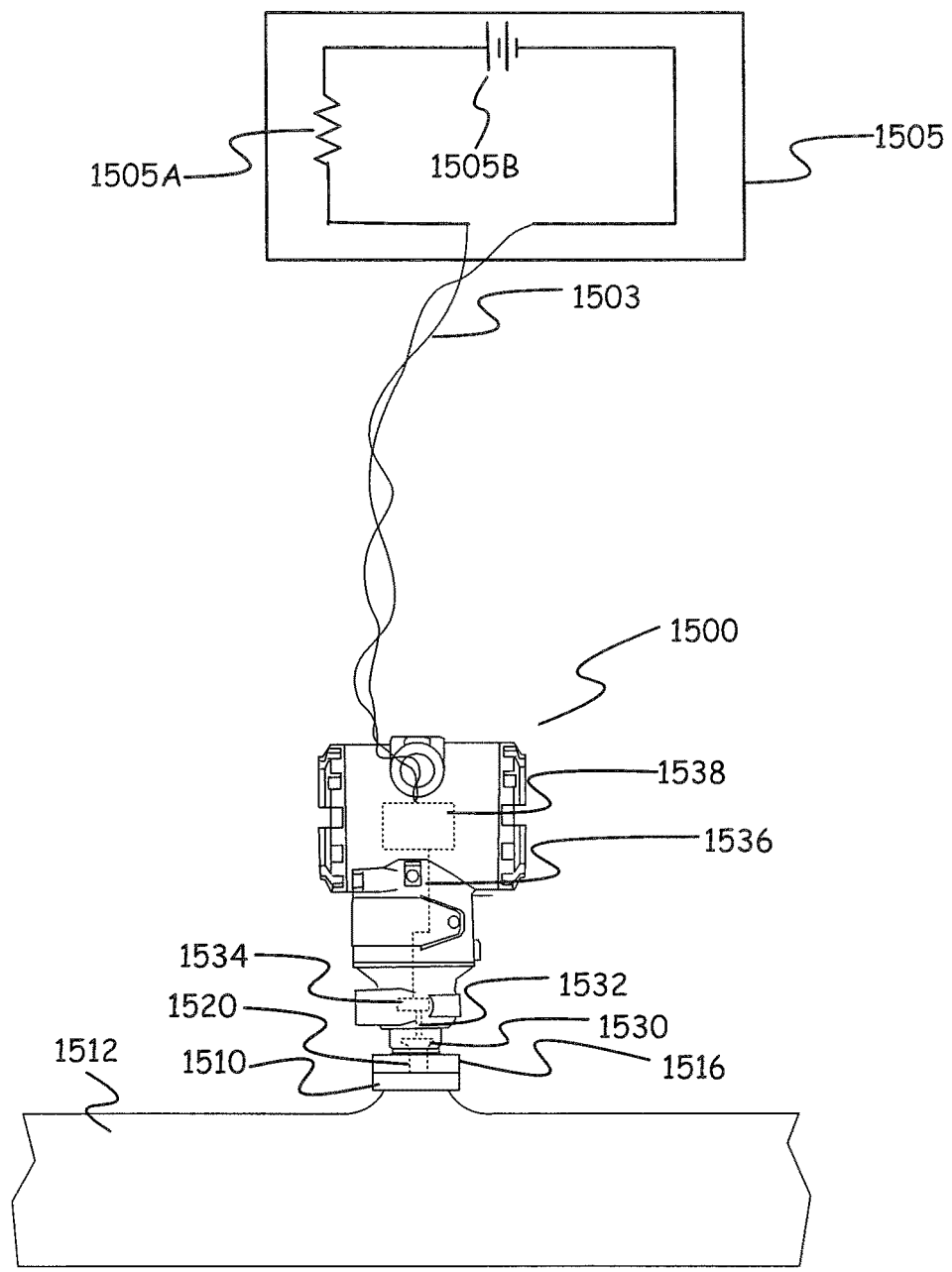
FIG. 14 provides a simplified diagram of a portion of an industrial process control system in which embodiments may be utilized.

FIG. 14 is a perspective view of a portion of a process control system in which the pressure sensors described above are used in accordance with some embodiments. In FIG. 14, a process variable transmitter 1500 is mounted to a process coupling 1510 of a pipe section 1512 by a mounting member 1516.

Mounting member 1516 includes a bore 1520 which extends from process coupling 1510 to an isolation diaphragm assembly 1530. Isolation diaphragm assembly 1530 includes an isolation diaphragm that isolates the process fluid in pipe section 1512 from isolation fluid carried in an isolation capillary 1532. Isolation capillary 1532 couples to a pressure sensor 1534, which takes the form of one of the pressure sensors described above. Sensor 1534 is configured to measure an absolute pressure (relative to vacuum) or a gage pressure (relative to atmospheric pressure) and provide an electrical output 1536 to transmitter circuitry 1538.

Transmitter circuitry 1538 communicates with a control room 1505 to provide one or more process variables to control room 1505, such as absolute pressure and gage pressure. Transmitter circuitry 1538 may communicate with control room 1505, illustrated as a resistance 1505A and a power supply 1505B, using various techniques including both wired and wireless communication. One common wired communication technique uses what is known as a two-wire process control loop 1503 in which a single pair of wires is used to carry information as well as provide power to transmitter 1500. One technique for transmitting information is by controlling the current level through process control loop 1503 between 4 milliamps and 20 milliamps. The value of the current within the 4-20 milliamp range can be mapped to corresponding values of the process variable. Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless protocols, such as radio-frequency communication techniques including WirelessHART® in accordance with IEC 62591, may also be implemented.

Although the present invention has been described with reference to preferred embodiments, workers skilled in the art will recognize that changes may be made in form and detail without departing from the spirit and scope of the invention.

What is claimed is:

1. A pressure sensor comprising:
   a base, having a high-pressure contact portion;
   a diaphragm positioned over the base and having an external top surface opposite the base, defined within a closed perimeter and external side surfaces extending down from an entirety of the closed perimeter toward the base, and a high-pressure contact portion aligned with and separated by a gap from the high-pressure contact portion of the base; and
   a sensing element coupled to the diaphragm and providing an output based on changes to the diaphragm;
   wherein when a hydrostatic pressure load above a threshold value is applied to the entire external top surface and external side surfaces, the hydrostatic pressure load causes the high-pressure contact portion of the diaphragm to contact the high-pressure contact portion of the base.

2. The pressure sensor of claim 1 wherein the high-pressure contact portion of the diaphragm is centrally located on the diaphragm.

3. The pressure sensor of claim 1 wherein the high-pressure contact portion of the diaphragm protrudes toward the base.

4. The pressure sensor of claim 1 wherein the high-pressure contact portion of the base protrudes toward the diaphragm.

5. The pressure sensor of claim 4 wherein the high-pressure contact portion of the diaphragm protrudes toward the base.

6. The pressure sensor of claim 1 wherein the diaphragm is bonded to the base at bonding portions of the diaphragm by a glass fit.

7. The pressure sensor of claim 1 wherein the diaphragm is bonded to the base at bonding portions of the diaphragm by a metal solder.

8. The pressure sensor of claim 1 wherein the diaphragm is bonded to the base at bonding portions of the diaphragm by a fusion bond.

9. The pressure sensor of claim 1 wherein the diaphragm is bonded to the base at bonding portions of the diaphragm by an anodic bond.

10. The pressure sensor of claim 1 wherein the diaphragm is bonded to the base at bonding portions of the diaphragm by a Silicon alloy bond.

11. The pressure sensor of claim 1 wherein the sensing element comprises a piezoresistance-based sensing element.

12. The pressure sensor of claim 1 wherein the sensing element comprises a capacitance-based sensing element.

13. The pressure sensor of claim 1 wherein the sensing element comprises a resonance sensing element.

14. The pressure sensor of claim 1 wherein the sensing element comprises an optical displacement sensing element.

15. The pressure sensor of claim 1 wherein the output of the sensing element has a first rate of change before the high-pressure contact portion of the diaphragm contacts the base and a second rate of change after the high-pressure contact portion of the diaphragm contacts the base.

16. The pressure sensor of claim 1 wherein the output of the sensing element is monotonic with pressure changes of the fluid after the high-pressure contact portion of the diaphragm contacts the base.

17. The pressure sensor of claim 1 wherein after the high-pressure contact portion of the diaphragm contacts the base, the hydrostatic pressure load on the external side surfaces of the diaphragm causes lateral compression of the diaphragm.

18. The pressure sensor of claim 17 wherein the lateral compression of the diaphragm reduces tensile stresses in the diaphragm.

19. The pressure sensor of claim 18 wherein the lateral compression of the diaphragm increases compression stresses in the diaphragm.

20. The pressure sensor of claim 17 wherein after high-pressure contact portion of the diaphragm contacts the base a maximum principal stress on the diaphragm decreases as the pressure applied to the external top surface and to the external side surfaces increases.

21. The pressure sensor of claim 1 wherein after the high-pressure contact portion of the diaphragm contacts the base, an internal portion of the diaphragm next to the high-contact portion is under compression stress.

22. The pressure sensor of claim 1 wherein after the high-pressure contact portion of the diaphragm contacts the base, an external portion of the diaphragm that is above the high-pressure contact portion is under tensile stress.

23. A sensor comprising:
a base with a support;
a primary diaphragm mounted on the base and isolated from contact with other structures, the diaphragm flexing in response to pressure applied to a top and sides of the diaphragm such that above a threshold pressure a portion of the diaphragm makes contact with a portion of the base, the diaphragm having a secondary deflectable region that continues to deflect after the portion of the diaphragm contacts the portion of the base; and
at least one sensing element that senses the flexing of the diaphragm and provides an output signal indicative of the flexing of the diaphragm and that senses deflection of the secondary deflectable region after the diaphragm contacts the base and provides an output signal indicative of deflection of the secondary deflectable region after the diaphragm contacts the base.

24. The sensor of claim 23 wherein after the portion of the diaphragm makes contact with the portion of the base, the output signal of the sensing element changes monotonically with increases in the pressure.

25. The sensor of claim 23 wherein after the portion of the diaphragm makes contact with the portion of the base, the pressure on the sides of the diaphragm cause compressive stress in the diaphragm to increase and tensile stress in the diaphragm to decrease.

26. The sensor of claim 23 wherein after the portion of the diaphragm makes contact with the portion of the base, the pressure on the sides of the diaphragm cause the maximum principle stress on the diaphragm to decrease as the pressure increases.

* * * * *